US006856255B2

(12) United States Patent
Chalitsios et al.

(10) Patent No.: US 6,856,255 B2
(45) Date of Patent: Feb. 15, 2005

(54) ELECTROMAGNETIC POWER AND COMMUNICATION LINK PARTICULARLY ADAPTED FOR DRILL COLLAR MOUNTED SENSOR SYSTEMS

(75) Inventors: Constantyn Chalitsios, Sugar Land, TX (US); Käte Irene Stabba Gabler, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 561 days.

(21) Appl. No.: 10/051,702

(22) Filed: Jan. 18, 2002

(65) Prior Publication Data

US 2003/0137430 A1 Jul. 24, 2003

(51) Int. Cl.[7] .................................................. G01V 3/00
(52) U.S. Cl. .................................. 340/854.4; 340/854.6
(58) Field of Search ........................... 340/854.4, 854.6; 166/250.1; 367/82

(56) References Cited

U.S. PATENT DOCUMENTS

| | | | |
|---|---|---|---|
| 4,788,544 A | | 11/1988 | Howard |
| 4,806,928 A | | 2/1989 | Veneruso |
| 4,901,069 A | | 2/1990 | Veneruso |
| 4,928,088 A | | 5/1990 | Jorion et al. |
| 5,008,664 A | | 4/1991 | More et al. |
| 5,278,550 A | | 1/1994 | Rhein-Knudsen et al. |
| 5,455,573 A | | 10/1995 | Delatorre |
| 6,247,542 B1 | * | 6/2001 | Kruspe et al. ................ 175/40 |
| 6,271,767 B1 | | 8/2001 | Frye et al. |
| 6,429,784 B1 | * | 8/2002 | Beique et al. ........... 340/853.2 |
| 6,564,883 B2 | * | 5/2003 | Fredericks et al. ........... 175/50 |
| 6,684,952 B2 | * | 2/2004 | Brockman et al. ..... 166/250.03 |

FOREIGN PATENT DOCUMENTS

| | | |
|---|---|---|
| GB | 2 360 532 A | 9/2001 |
| US | 2001/0035288 | 11/2001 |
| WO | WO 99/36802 | 7/1999 |

* cited by examiner

*Primary Examiner*—Albert K. Wong
(74) *Attorney, Agent, or Firm*—Jennie (JL) Salazar; Brigitte L. Echols

(57) ABSTRACT

An electromagnetic coupling system is disclosed which includes a first electromagnetic transducer sealingly disposed in an outer wall of a tool mandrel, the mandrel adapted to be positioned in a drill collar. A second electromagnetic transducer is sealingly disposed in an interior of a port in the drill collar. The second transducer is positioned so that it is proximate the first transducer when the mandrel is positioned in the drill collar. A third electromagnetic transducer is sealingly disposed in an exterior of the port in the collar. The second and third transducers define a sealed chamber in the port. The second and third transducers are electrically coupled to power conditioning and signal processing circuits disposed in the chamber. A fourth transducer is positioned proximate the third transducer. The fourth transducer is electrically coupled to at least one of a sensor, an external communication line and an external power line.

21 Claims, 4 Drawing Sheets

ELECTROMAGNETIC POWER AND COMMUNICATION LINK PARTICULARLY ADAPTED FOR DRILL COLLAR MOUNTED SENSOR SYSTEMS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF INVENTION

1. Field of the Invention

The invention relates generally to the field of measurement while drilling (MWD) systems. More particularly, the invention relates to devices for communicating electrical power and sensor signals to and from sensors mounted proximate an external wall of a drill collar.

2. Background Art

MWD systems known in the art are used to make measurements of various drilling parameters and earth formation characteristics during the drilling of a wellbore. These measurements include, for example, the trajectory of the wellbore (inferred from measurements of trajectory of the MWD system based on the earth's gravity and its magnetic field), shock and vibration magnitude (inferred from acceleration measurements and/or strain measurements), and torque and axial loading applied to the collar (inferred from strain on the drill collar along various directions).

To make such measurements, MWD systems include various types of sensors and transducers mounted proximate the exterior wall of a drill collar in which the MWD system is disposed. Signals from the sensors are communicated to a signal processing and telemetry unit forming part of the MWD system. The signal processing and telemetry unit operates a transmitter which sends signals to a receiver at the earth's surface. These signals are typically in the form of modulation of the flow of drilling fluid (drilling mud) used to drill the wellbore. The signals represent the measurements made by the various sensors. Some of the measurements may also be stored in a recording device or memory in the signal processing and telemetry unit for later recovery when the MWD system is removed from the wellbore.

Some types of MWD systems are mounted in a mandrel, or similar housing, which is adapted to be removed from the interior of the drill collar for repair and maintenance. Using a mandrel type housing for the MWD system with sensors mounted near the exterior wall of the drill collar requires various types of electrical feed through devices to conduct signals from the sensors to appropriate circuits in the MWD mandrel. These electrical feed through devices also conduct electrical power to the sensors when such is needed. Electrical feed through devices can make repair and maintenance of the MWD system difficult and expensive. What is needed is a device which can eliminate the need to use electrical feed through devices in an MWD system.

SUMMARY OF INVENTION

One aspect of the invention is an electromagnetic coupling system which includes a first electromagnetic transducer sealingly disposed in an outer wall of a tool mandrel. The too mandrel is adapted to be positioned in a drill collar. A second electromagnetic transducer is sealingly disposed in an interior of a port in the drill collar. The second transducer is positioned so that it is proximate the first transducer when the mandrel is positioned in the drill collar. A third electromagnetic transducer is sealingly disposed in an exterior of the port in the collar. The second and third transducers define a sealed chamber in the port. The second and third transducers are electrically coupled to power conditioning and signal processing circuits disposed in the chamber. A fourth transducer is positioned proximate the third transducer. The fourth transducer is electrically coupled to at least one of a sensor, an external communication line and an external power line.

Another aspect of the invention concerns a method for interrogating a data storage device disposed in a mandrel, wherein the mandrel is disposed in a drill collar. In a method according to this aspect of the invention, an interrogation command signal is sent through an external device clamped onto an exterior wall of the drill collar. The signal is electromagnetically transferred between the external clamp-on device and an exterior wall of the drill collar. The signal is then electromagnetically transferred between an interior wall of the drill collar and an exterior wall of the mandrel. The signal is then coupled to a processor in the mandrel to cause the processor to export data in the storage device. The data are then electromagnetically transferred between the exterior wall of the mandrel and the interior wall of the collar and are then electromagnetically transferred between the exterior wall of the collar and the external clamp-on device.

Another aspect of the invention is a sensor system including at least one sensor disposed in a wall of a drill collar. The system includes a signal processing and power conditioning circuit disposed in the wall of the drill collar and operatively coupled to the at least one sensor. The signal processing and power conditioning circuit is adapted to provide operating power extracted from an electromagnetic link. The signal processing and power conditioning circuit is adapted to digitize, locally store and transmit signals generated by the at least one sensor. The system further includes a first electromagnetic transducer disposed in the drill collar and adapted to transfer power and signals to a second electromagnetic transducer disposed in a mandrel when the mandrel is disposed at a selected position inside the drill collar. The second transducer is operatively coupled to signal processing circuits in the mandrel.

Other aspects and advantages of the invention will be apparent from the following description and the appended claims.

DETAILED DESCRIPTION

Various embodiments of the invention relate to structures for communicating electrical power and signals between a "mandrel" type MWD system and one or more sensors disposed in the wall of a drill collar, without the need for electrical feed through devices and/or hard wired electrical connections between the one or more sensors and various electronic circuits within the mandrel. Other embodiments of the invention provide a mandrel-type MWD system with the capability to communicate data stored therein to an external electrical circuit, device or data processing unit, and/or receive calibration signals, command signals or programming signals from an external electronic device, without the need for electrical feed through devices or other forms of hard wiring circuits in the mandrel to the external device.

Figure 1:
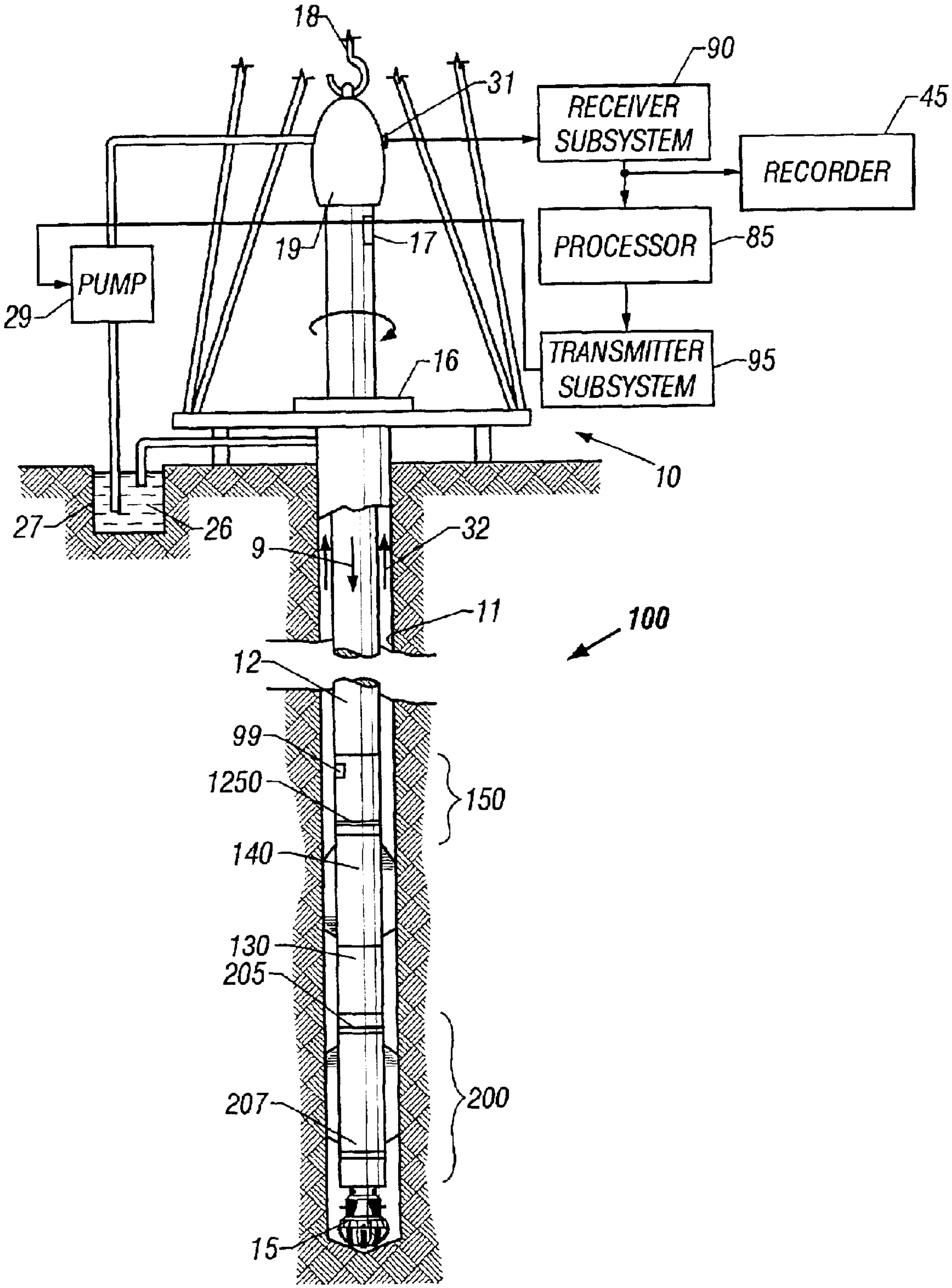
FIG. 1 shows one example of an MWD system which may include various embodiments of the invention.

An example of a measurement while drilling (MWD) system which may include one or more embodiments of the invention is shown generally in FIG. 1. For convenience, an instrument combination which includes so-called "logging while drilling" (LWD) and MWD systems will be referred to hereinafter collectively as the "MWD system". A drilling rig including a derrick 10 is positioned over a wellbore 11 which is drilled by a process known as rotary drilling. A drilling tool assembly ("drill string") 12 and drill bit 15 coupled to the lower end of the drill string 12 are disposed in the wellbore 11. The drill string 12 and bit 15 are turned, by rotation of a kelly 17 coupled to the upper end of the drill string 12. The kelly 17 is rotated by engagement with a rotary table 16 or the like forming part of the rig 10. The kelly 17 and drill string 12 are suspended by a hook 18 coupled to the kelly 17 by a rotatable swivel 19. Alternatively, the kelly 17, swivel 19 and rotary table 16 can be substituted by a "top drive" or similar drilling rotator known in the art.

Drilling fluid ("drilling mud") is stored in a pit 27 or other type of tank, and is pumped through the center of the drill string 12 by a mud pump 29, to flow downwardly (shown by arrow 9) therethrough. After circulation through the bit 15, the drilling fluid circulates upwardly (indicated by arrow 32) through an annular space between the wellbore 11 and the outside of the drill string 12. Flow of the drilling mud lubricates and cools the bit 15 and lifts drill cuttings made by the bit 15 to the surface for collection and disposal.

A bottom hole assembly (BHA), shown generally at 100, is connected within the drill string 12. The BHA 100 in this example includes a stabilizer 140 and drill collar 130 which mechanically connect a local measuring and local communications device 200 to the BHA 100. In this example, the BHA 100 includes a toroidal antenna 1250 for electromagnetic communication with the local measuring device 200, although it should be understood that other communication links between the BHA 100 and the local device 200 could be used with the invention. The BHA 100 includes a communications system 150 which provides a pressure modulation telemetry transmitter and receiver therein. Pressure modulation telemetry can include various techniques for selectively modulating the flow (and consequently the pressure) of the drilling mud flowing downwardly 9 through the drill string 12 and BHA 100. One such modulation technique is known as phase shift keying of a standing wave created by a "siren" (not shown) in the communications system 150. A transducer 31 disposed at the earth's surface, generally in the fluid pump discharge line, detects the pressure variations generated by the siren (not shown) and conducts a signal to a receiver decoder system 90 for demodulation and interpretation. The demodulated signals can be coupled to a processor 85 and recorder 45 for further processing. Optionally, the surface equipment can include a transmitter subsystem 95 which includes a pressure modulation transmitter (not shown separately) that can modulate the pressure of the drilling mud circulating downwardly 9 to communicate control signals to the BHA 100. It should be clearly understood that the configuration of the MWD system shown and described herein is only one example of MWD system configuration, and is not intended to limit the invention. Use of a local device such as shown at 200 is not needed in any particular embodiment of the invention, and in many embodiments of an MWD system which includes one or more embodiments of the invention, the local device 200 may be omitted entirely, as well as the antenna 1250 forming part of the collar 100.

The communications subsystem 150 may also include various types of processors and controllers (not shown separately) for controlling operation of sensors disposed therein, and for communicating command signals to the local device 200 and receiving and processing measurements transmitted from the local device 200. Sensors in the BHA 100 and/or communications system 150 can include, among others, magnetometers and accelerometers (not shown separately in FIG. 1). As is well known in the art, the output of the magnetometers and accelerometers can be used to determine the rotary orientation of the BHA 100 with respect to earth's gravity as well as a geographic reference such as magnetic and/or geographic north. The output of the accelerometers and magnetometers can also be used to determine the trajectory of the wellbore 11 with respect to the same references, as is known in the art. The BHA 100 and/or the communications system 150 can include various forms of data storage or memory which can store measurements made by any or all of the sensors, including sensors disposed in the local instrument 200, for later processing as the drill string 12 is withdrawn from the wellbore 11.

Figure 2:
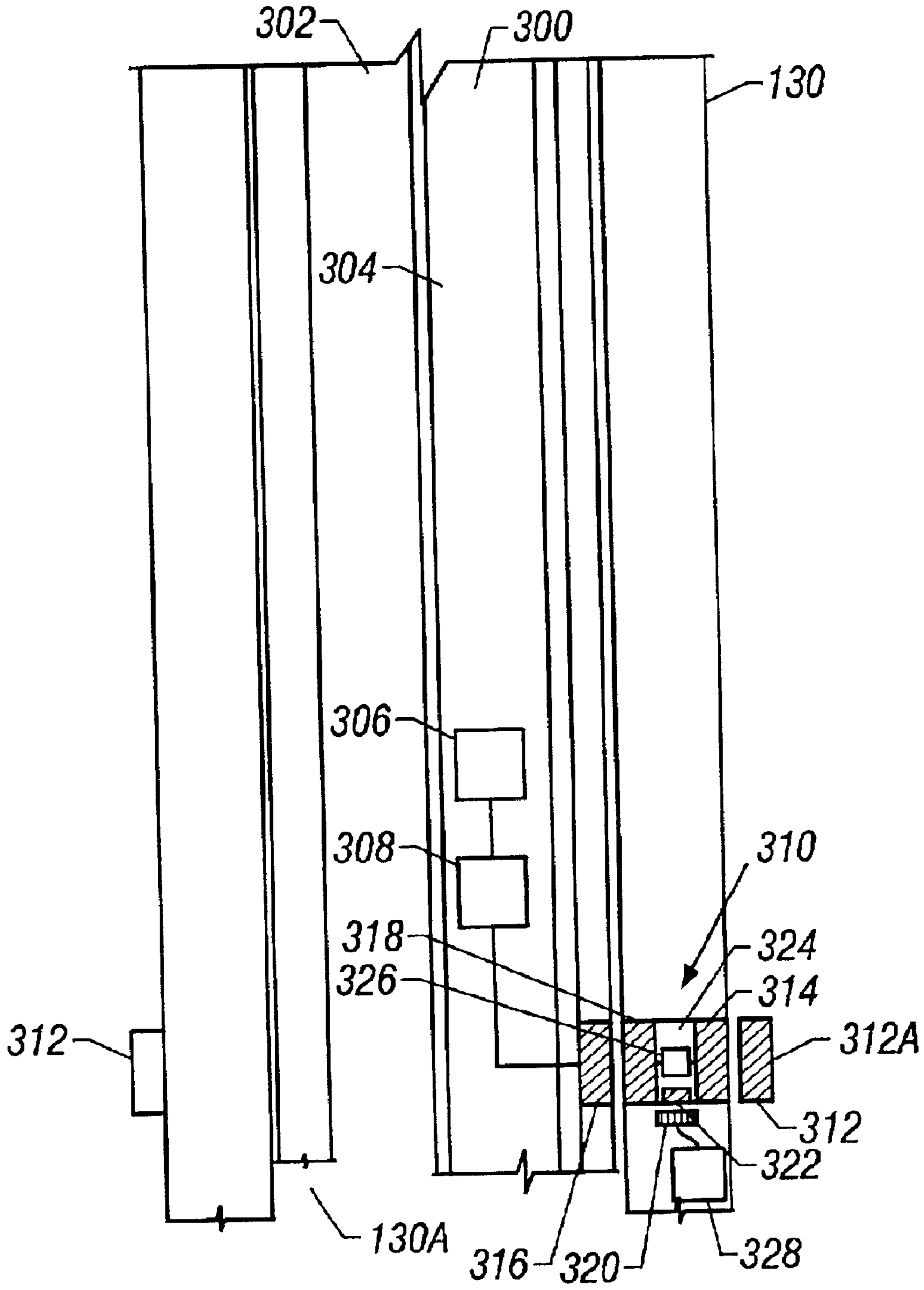
FIG. 2 shows an axial cutaway view of a tool mandrel in a drill collar. One embodiment of a coupling according to the invention is shown in the wall of the collar and mandrel.

Various embodiments of a power and communication link according to various aspects of the invention are shown generally FIG. 2 in a cut away view of the drill collar 130. The drill collar 130 is generally tubular in shape and is formed from steel or high strength non-magnetic alloy such as monel. The collar 130 includes therethrough a central bore 130A which is adapted to receive a mandrel 300 therein. The mandrel 300 may include a passage 302 for the drilling mud, and includes an interior chamber 304 which contains various electronic devices such as a signal processing unit 308 and a controller 306. The signal processing unit 308 may be adapted to operatively couple to various sensors (not shown in FIG. 2) to receive signals therefrom and process the signals into a form suitable for recording and/or transmitting to the earth's surface. The controller 306 may include various programming instructions for modes of operating the processing unit 308 and formatting the telemetry. Such systems of signal processing and controller operation are well known in the art and the types thereof are not intended to limit the scope of invention.

An electromagnetic coupling or link 310 according to various aspects of the invention includes a first transducer element 316 generally disposed in a port in the wall of the mandrel 300 such that when the mandrel 300 is disposed inside the drill collar 130 in an assembled position, the first transducer element 316 is disposed proximate a second transducer coil 318. The second transducer element 318 is disposed proximate the interior surface of the drill collar 130 in a port in the collar wall. Signal processing and/or power conditioning circuits 326 are disposed inside a chamber 324 formed between the second transducer element 318 and a third transducer element 314 disposed in the collar wall port proximate the exterior surface of the collar wall. The transducer elements 316, 318, 324 are adapted to sealingly close the port and the chamber 324 therein to exclude drilling fluid from entering the chamber 324. The first transducer 316 is also electrically coupled to circuits (such as processor 308 and controller 306) disposed in the mandrel 300, while the second 318 and third 314 transducer elements are electrically coupled to the signal processing and/or power conditioning circuits 326 disposed in the chamber 324.

In some embodiments, the third transducer element 314 is positioned so that an external clamp-on device 312, having a fourth transducer element 312A therein, may be removably attached or affixed to the exterior surface of the drill collar 130. The external clamp-on device in some embodiments includes a sensor (not shown separately in FIG. 2) therein. In other embodiments, the external clamp-on device may be electrically coupled to the receiver decoder system (90 in FIG. 1) for interrogating the contents of the recording device in the controller 308 or processor 306, and/or for communicating instructions and/or sensor calibration signals from the receiver decoder system (90 in FIG. 1) to the controller 308, processor 306, or various types of a sensor 328 disposed in the collar wall.

In some embodiments, the chamber 324 includes therein a fifth transducer element sealingly 322 disposed in the port and disposed proximate a sixth transducer element 320 operatively coupled to the sensor 328 upon assembly of the mandrel 300 within the drill collar 130. The fifth transducer element 322 is coupled to the circuits 326 in the chamber 324 so that power and signals may be communicated between the circuits in the mandrel 300 and the sensor 328 in the collar 130 wall. The particular position of the third 314, fourth 312, fifth 322 and sixth 320 transducer elements shown in FIG. 2 is only meant to illustrate the general principle of the invention and is not intended to limit the scope of the invention. Generally speaking, various arrangements of transducer elements in an MWD system according to the invention are intended to enable removal and insertion of the mandrel 300 from the collar 130 without the need to use electrical feed through devices and without the need to make and break "hard wired" electrical connections between circuits in the mandrel 300 and external devices such as sensors and power and communication cables. In another aspect of the invention, various arrangements of transducer elements in an MWD system are intended to enable power and data communication between circuits in an MWD system and an external electronic device without the need for feed through devices or hard wired electrical connections therebetween.

It should also be understood that the sensor 328, when so used, may be any type of sensor typically disposed in the wall of a drill collar for measurement and/or logging while drilling applications. Examples of such sensors, without limiting the scope of the invention, include accelerometers, magnetometers, acoustic transducers, electromagnetic antennas, electrodes, radiation detectors and strain gauges.

Other embodiments of an electromagnetic link may include only the transducer elements 322, 320 operatively coupling the sensor 328 to the circuits in the mandrel 300. These embodiments may therefore not include the third 314 and fourth 312 transducer elements adapted to communicate with the external clamp-on device. Other embodiments may exclude the collar wall mounted sensor 328 and its associated transducer elements 322, 320.

Figure 3:
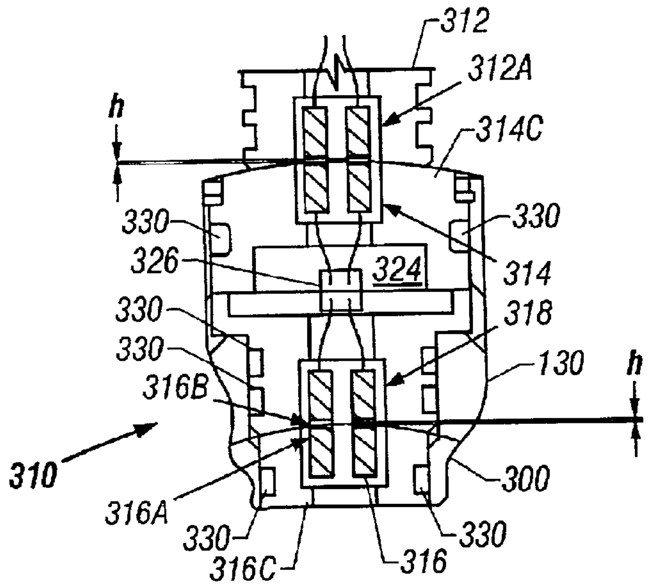
FIG. 3 shows an embodiment of an electromagnetic coupling in more detail.

One embodiment of the electromagnetic link 310 intended to electromagnetically couple circuits in the mandrel 300 to the external clamp-on device 312 is shown in more detail in FIG. 3. As previously explained with respect to FIG. 2, the first transducer element 316 is sealingly disposed in a port in the wall of the mandrel 300. Sealing engagement may be attained by disposing a coil assembly (including winding 316A disposed on bobbin 316B coupled to the interior of a plug 316C). The plug 316C is adapted to fit inside the port in the wall of the mandrel 300. Grooves 330 in the outer surface of the plug 316C seal against the port in the mandrel 300. The bobbin 316B in this embodiment is made from ceramic and is intended to sealingly enclose the winding 316A. The winding 316A in this embodiment is a coil of wire adapted to have a magnetic moment substantially perpendicular to the wall of the mandrel. By selecting a material for the bobbin 316B which has a magnetic permeability less than that of the surrounding mandrel 300 wall, substantially all the magnetic flux from the first transducer coil will be disposed inside the port in the mandrel wall. Ceramic is preferred for the bobbin 316B because of its resistance to abrasive wear by the passage of any drilling fluid on the exterior of the first transducer element 316. As can be inferred from FIG. 3, the exterior surface of the bobbin 316B is exposed to the environment outside the mandrel 300, which may include moving drilling fluid. The center of the winding 316A may be air filled, or filled with a high magnetic permeability, low electrical conductivity material such as ferrite, as alternatives to using ceramic. Typically, a gap h between corresponding pairs (e.g., the first 316 and second 318 transducers) of transducer elements when the mandrel, collar and external device are in assembled position, is sufficiently small so that no highly magnetically permeable material need be disposed inside the windings to provide strong enough electromagnetic coupling between corresponding transducer pairs. However, in certain circumstances it may be advantageous to use a high magnetic permeability material in the core of each coil. It should also be understood that materials other than ceramic maybe used to enclose the winding 316A. Preferably any such material is electrically nonconductive, high strength and is able to withstand ambient temperature and pressure in the wellbore.

The second transducer element 318 is formed similarly to the first transducer element 316, and includes its own bobbin, winding, plug and o-ring grooves 330. O-rings (not shown) are placed in the grooves 330 to seal each plug against its respective port. As previously explained with respect to FIG. 2, the second transducer element 318 is adapted to be sealingly disposed in the interior of the port through the drill collar 130 wall. The second transducer element 318 winding is disposed such that when the mandrel 300 is correctly positioned inside the drill collar 130, it is disposed proximate the winding 316A of the first transducer element 316. Also as explained with respect to FIG. 2, the third transducer element 314 is sealingly disposed in the outer part of the port in the collar wall. As is the case for the first 316 and second 318 transducer elements, the third transducer element 314 includes a plug 314C having o-ring grooves 330 on the outer lateral surface thereof, a bobbin 314B and a winding 314A formed so that its magnetic moment is substantially perpendicular to the wall of the collar 130.

In the embodiment of FIG. 3, the external clamp-on device 312 includes the fourth transducer element 312A therein. The fourth transducer element 312A is disposed so that when the clamp-on device 312 is affixed to the exterior wall of the collar 130, the fourth transducer element 312A enables electromagnetic communication with the third transducer element 314. As previously explained with respect to FIG. 2, the fourth transducer element 312 may be operatively coupled to a sensor or to an external communication line (not shown) such as may be connected to the receiver decoder system (90 in FIG. 1).

In one embodiment of a method of communicating with an MWD system according to the invention, control signals are sent from the receiver decoder system (90 in FIG. 1) through a communication line or cable to the external clamp-on device 312. The signals energize the fourth transducer element 312A, whereupon they are electromagnetically communicated to the third transducer element 314. The signals are conducted through the power conditioning/signal processing circuits 326 to the second transducer element 318, and thus through the drill collar 130. The second transducer element 318 electromagnetically communicates the control signals to the first transducer element 316, whereupon the control signals are received by the processor 308 and controller 306 in the mandrel 300. The control signals may be, for example, to reprogram operation of the MWD system, such as changing data which are to be sent my the mud flow modulation telemetry. The control signals may also be to cause the controller 306 to transmit data stored therein or in any other storage device in the MWD system to the first transducer element 316. When transmitted to the first transducer element 316, the data ultimately are communicated to the external clamp-on device, and thus to the receiver decoder unit (90 in FIG. 1). Advantageously, communicating data from or reprogramming the MWD system using a method according to the invention eliminates the need for hard wired electrical connection to the MWD system such as through a data port in the wall of the drill collar.

Also as previously explained with respect to FIG. 2, the sealing disposition, and the shape of the corresponding plugs thereof, of the second 318 and third 314 transducer elements forms the sealed chamber 324 in which the signal processing and/or power conditioning circuits 326 are disposed.

Figure 4:
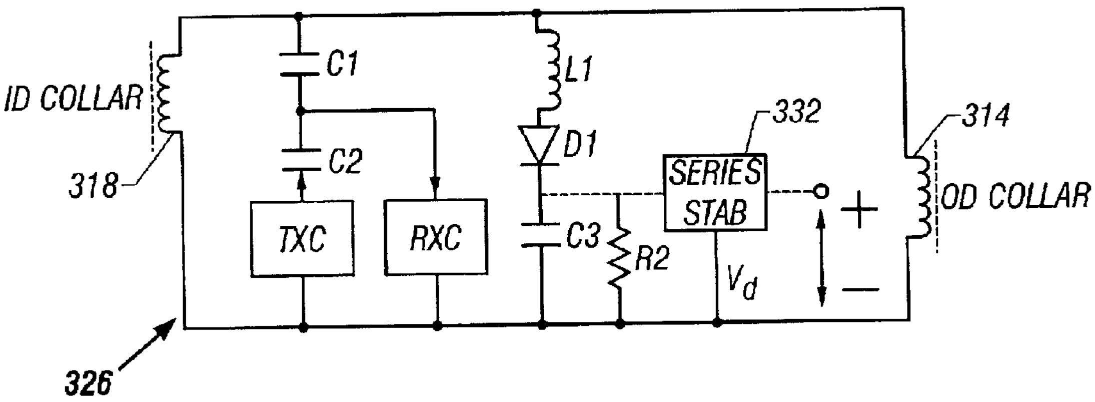
FIG. 4 shows one example of a signal processing and power conditioning circuit disposed in a chamber defined in the wall of the drill collar.

One example of a signal processing and power conditioning circuit 326, which is to be disposed in the chamber (324 in FIG. 2) is shown in schematic form in FIG. 4. A transceiver circuit including TXC and RXC may be capacitively coupled, through C1 and C2, to the second 318 and third 314 transducer elements. The transceiver circuit may be used for, among other functions, digitizing and locally storing measurements made by the sensor (when used) and transmitting the digitized signals to the processor (306 in FIG. 2) for recording and communication to the mud flow modulation telemetry. The transceiver circuit may also, for example, detect signals sent from the circuits in the mandrel and reformat them, such as into analog signals, for communication to the external clamp-on device (312 in FIG. 2). One example of such an arrangement would be generation of radio-frequency alternating current to be coupled to an antenna (which in this example forms the external clamp-on device). Such antennas are used, for example, in measurement of electromagnetic propagation properties of earth formations to determine resistivity thereof.

As previously explained, the transducer elements can also be used to conduct electrical power without hard wired electrical connection. When the transducer elements are used to conduct electrical power, a power conditioning circuit, which includes a filter/rectifier such as L1, D1, C3, R1 and R2, may be coupled to a series stabilizer 332 to provide direct current to operate other circuits, such as the transceiver circuit TXC, RXC. Power transmission may also be used to provide electrical power to a sensor, when used. One example of powering a sensor is to actuate an ultrasonic transducer to cause it to emit pulses of acoustic energy. After a selected period of time, the ultrasonic transducer may be coupled to a receiver circuit, through the transducer elements as suggested in FIG. 2, to detect signals returning from earth formations surrounding the drill collar (130 in FIG. 2).

Figure 5:
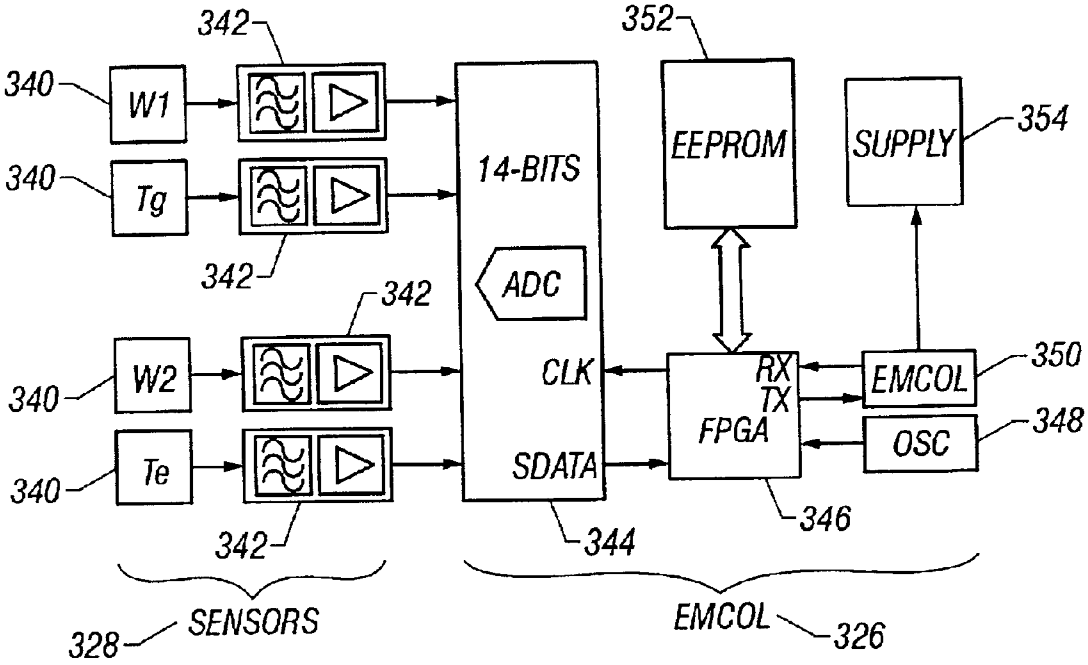
FIG. 5 shows one example of a collar wall mounted sensor system directly coupled to an embodiment of a signal processing power conditioning circuit.

Another embodiment of the invention is shown schematically in FIG. 5. this embodiment includes a plurality of sensors 340 (collectively shown as 328) disposed in the wall of the drill collar (130 in FIG. 2). The sensors 340 in this embodiment are coupled to corresponding analog filters and amplifiers 344. The output of each corresponding filter/amplifier in this embodiment is directed to the signal processing/power conditioning circuit 326 disposed in the sealed chamber (324 in FIG. 3). The signal processing/power conditioning circuit 326 in this embodiment includes an analog to digital converter (ADC) 344 which digitizes the sensor signals. Output of the ADC 344 may be selectively sent to the circuits in the mandrel (300 in FIG. 2) through the first and second transducers (316, 318 in FIG. 2, shown collectively as 350 in FIG. 5) or may be stored locally in a memory 352, depending on instructions stored in a local controller 346. A local clock 348 provides timing for the local controller 346. Power for operating the signal processing circuits (ADC 344, memory 352, local clock 348 and local processor 346) is provided by power conditioning unit 354, which can be designed such as the embodiment shown in FIG. 4. One advantage that may be offered by the embodiment of FIG. 5 is the ability to service the circuits in the mandrel without the need to recalibrate the sensors 340. This is a result of having digitzing circuits (ADC 344) disposed in the collar wall (in chamber 324), providing that signals sent to the mandrel circuits are already in digital form. No analog signal connection need be broken or altered to service the mandrel or its associated circuits. Another advantage which may be offered by the embodiment shown in FIG. 5, particularly when combined with the embodiment such as shown in FIG. 2 that includes the third and fourth electromagnetic transducers, is the capacity to calibrate the sensors 340 without the need to have the mandrel (300 in FIG. 2) disposed in the collar (130 in FIG. 2) or the need to have the mandrel circuits operating during calibration. To calibrate the sensors 340 using this embodiment, the external clamp-on device (312 in FIG. 2) is coupled to the recording unit (90 in FIG. 1), which sends electrical power and calibrate instructions through the fourth transducer. The power and signals are thus electromagnetically coupled to the third transducer, where they are converted to "clean" power in the power conditioning unit 354 to operate the signal processing circuits (ADC 344, local processor 346, local clock 348 and memory 352). The calibrate instructions may include instructions to record a measurement made by each sensor 340 in a selected environment, such as an approximate "zero" value of a parameter to be measured, and a sensor offset value therein may be measured and locally recorded in memory 352. In a second calibration element, the sensors may be placed in an environment representing a known, positive value of the parameter to be measured, and a gain value for each sensor 340 may be calculated. The locally stored values of gain and offset may be transmitted to the mandrel circuits during operation of the MWD system so that calibrated values of sensor measurements may be stored in the mandrel processor (308 in FIG. 2) and/or transmitted in the mud flow modulation telemetry.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An electromagnetic link system comprising:

a first electromagnetic transducer sealingly disposed in an outer wall of a tool mandrel, the mandrel adapted to be positioned in a drill collar;

a second electromagnetic transducer sealingly disposed in an interior of a port in the drill collar, the second transducer disposed proximate the first transducer when the mandrel is positioned in the drill collar;

a third electromagnetic transducer sealingly disposed in an exterior of the port in the collar, the second and third transducers defining a sealed chamber in the port, the second and third transducers electrically coupled to power conditioning and signal processing circuits disposed in the chamber; and a fourth electromagnetic transducer positioned proximate the third transducer, the fourth transducer electrically coupled to at least one of a sensor, an external communication line and an external power line.

2. The system as defined in claim 1 wherein each of the transducers comprises a winding formed on a bobbin, each bobbin adapted to sealingly enclose a corresponding one of the windings, each winding having a principal magnetic moment substantially perpendicular to a wall of the mandrel and the drill collar.

3. The system as defined in claim 2 wherein each bobbin is formed from a material having a lower magnetic permeability than the drill collar and the mandrel.

4. The system as defined in claim 1 wherein the at least one circuit in the mandrel comprises a controller adapted to receive instructions from a recording and signal processing unit, and wherein the fourth transducer is disposed in a device adapted to be affixed to the exterior of the collar, the fourth transducer electrically coupled to the recording and signal processing unit.

5. The system as defined in claim 1 further comprising at least one sensor disposed in the wall of the drill collar, the at least one sensor operatively coupled to the signal processing and power conditioning circuits disposed in the chamber.

6. The system as defined in claim 5 wherein the at least one circuit in the mandrel is adapted to receive calibration data from a recording and signal processing unit and wherein the fourth transducer is disposed in a device adapted to be affixed to the exterior of the collar, the fourth transducer electrically coupled to the recording and signal processing unit.

7. The system as defined in claim 5 wherein the signal processing and power conditioning circuit in the collar is adapted to receive calibration data from a recording and signal processing unit and wherein the fourth transducer is disposed in a device adapted to be affixed to the exterior of the collar, the fourth transducer electrically coupled to the recording and signal processing unit.

8. A method for interrogating a data storage device disposed in a mandrel, the mandrel disposed in a drill collar, comprising:

sending an interrogation command signal through an external device clamped onto an exterior wall of the drill collar;

electromagnetically transferring the signal between the external clamp-on device and an exterior wall of the drill collar;

electromagnetically transferring the signal between an interior wall of the drill collar and an exterior wall of the mandrel;

coupling the signal to a processor in the mandrel to cause the processor to export data in the storage device;

electromagnetically transferring the data between the exterior wall of the mandrel and the interior wall of the collar; and electromagnetically transferring the data between the exterior wall of the collar and the external clamp-on device.

9. The method as defined in claim 8 further comprising reprogramming a controller disposed in the mandrel by sending a reprogramming signal to the external device.

10. The method as defined in claim 8 further comprising prior to the interrogating:

operating a sensor disposed in the collar to generate a sensor signal;

electromagnetically transferring the sensor signal between the interior wall of the collar and the exterior wall of the mandrel; and conducting the sensor signal to the storage device.

11. A method for operating a sensor, comprising:

electromagnetically transferring electrical power from circuits in a mandrel disposed inside a drill collar between an exterior wall of the mandrel and an interior wall of the collar;

conducting the electrical power to the sensor to operate the sensor;

conducting signals generated by the sensor to a location proximate the interior wall of the collar;

electromagnetically transferring the sensor signals between the interior wall of the collar and the exterior wall of the mandrel; and conducting the sensor signals to the circuits in the mandrel.

12. The method as defined in claim 11 wherein the conducting the electrical power and the sensor signals between the collar and the sensor is performed electromagnetically.

13. The method as defined in claim 11 further comprising:

storing the sensor signals in a storage device in the mandrel;

sending an interrogation command signal through an external device clamped onto an exterior wall of the drill collar;

electromagnetically transferring the command signal between the external clamp-on device and an exterior wall of the drill collar;

electromagnetically transferring the command signal between an interior wall of the drill collar and an exterior wall of the mandrel;

coupling the signal to the circuits in the mandrel to cause the circuits to export data in the storage device;

electromagnetically transferring the data between the exterior wall of the mandrel and the interior wall of the collar; and electromagnetically transferring the data between the exterior wall of the collar and the external clamp-on device.

14. The method as defined in claim 13 further comprising reprogramming a controller disposed in the mandrel by sending a reprogramming signal to the external device.

15. The method as defined in claim 11 further comprising digitizing the sensor signals in a signal processing unit disposed in the drill collar prior to electromagnetically transferring the signals to the circuits in the mandrel.

16. The method as defined in claim 15 further comprising electromagnetically transferring a gain value and an offset value for at least one of the sensor signals to the circuits in the mandrel.

17. The method as defined in claim 16 further comprising:

attaching a device having an electromagnetic transducer element therein to an exterior wall of the drill collar, the device coupled to a system adapted to generate calibration instructions;

eletromagnetically transferring the calibration instructions to the signal processing unit in the drill collar;

operating the sensor so as to determine at least one gain and offset value for at least one of the sensors; and storing the at least one gain and offset value in the signal processing circuit.

18. The method as defined in claim 17 further comprising electromagnetically transferring the at least one gain and offset value to the circuits in the mandrel.

19. A sensor system, comprising:

at least one sensor disposed in a wall of a drill collar;

a signal processing and power conditioning circuit disposed in the wall of the drill collar and operatively coupled to the at least one sensor, the signal processing and power conditioning circuit adapted to provide operating power extracted from an electromagnetic link, the signal processing and power conditioning circuit adapted to digitize, locally store and transmit signals generated by the at least one sensor; and a first electromagnetic transducer disposed in the drill collar and adapted to transfer power and signals to a second electromagnetic transducer disposed in a mandrel when the mandrel is disposed at a selected position inside the drill collar, the second transducer operatively coupled to signal processing circuits in the mandrel.

20. The sensor system as defined in claim 19 further comprising a third electromagnetic transducer disposed the drill collar and adapted to electromagnetically coupled to a fourth electromagnetic transducer adapted to be affixed to the exterior wall of the drill collar, the fourth electromagnetic transducer adapted to be coupled to a device adapted to provide calibration instructions to the signal processing and power conditioning circuit, and wherein the signal processing and power conditioning circuit is adapted to execute the calibration instructions and receive electrical power from the device adapted to provide calibration instructions by electromagnetic transfer between the third and fourth transducers.

21. The sensor system as defined in claim 19 wherein the signal processing and power conditioning circuit is adapted to transmit calibration data to the signal processing circuits in the mandrel, and the signal processing circuits in the mandrel are adapted to generate calibrated sensor signals for at least one of recording therein and transmission of the calibrated sensor signals through a mud flow modulation telemetry device.

* * * * *